United States Patent [19]

Haneda et al.

[11] Patent Number: 4,554,641

[45] Date of Patent: Nov. 19, 1985

[54] PROGRAMMABLE CALCULATOR

[75] Inventors: Isamu Haneda; Tetsuo Myooi, both of Nara, Japan

[73] Assignee: Sharp Kabushiki Kaisha, Osaka, Japan

[21] Appl. No.: 236,211

[22] Filed: Feb. 19, 1981

[30] Foreign Application Priority Data

Feb. 19, 1980 [JP] Japan .................................. 55-19952

[51] Int. Cl.$^4$ ........................ G06F 3/023; G06F 9/06; G06F 15/02
[52] U.S. Cl. ..................................... 364/710; 364/706
[58] Field of Search ........................ 364/706, 709, 710

[56] References Cited

U.S. PATENT DOCUMENTS

| | | | |
|---|---|---|---|
| 3,976,975 | 8/1976 | Cochran | 364/710 X |
| 3,979,057 | 9/1976 | Katz et al. | 364/706 |
| 3,979,058 | 9/1976 | Katz et al. | 364/706 |
| 4,075,679 | 2/1978 | Christopher et al. | 364/706 X |
| 4,156,918 | 5/1979 | Olander, Jr. et al. | 364/706 |

Primary Examiner—Jerry Smith
Attorney, Agent, or Firm—Birch, Stewart, Kolasch & Birch

[57] ABSTRACT

A programmable calculator is disclosed which includes a display panel for displaying numerical or alphabetical data, and a keyboard for introducing desired numerical or alphabetical data into a space assigned for a variable. The calculator is further adapted to selectively erase the previous contents on the display panel and display only the introduced numerical or alphabetic data upon introduction of the numerical or alphabetic data or to inhibit erasure of the previous contents on the display panel and display the introduced numerical or alphabetic data together with the previous contents upon introduction of the numerical or alphabetic data.

3 Claims, 4 Drawing Figures

PROGRAMMABLE CALCULATOR

BACKGROUND OF THE INVENTION

This invention relates to a key input method for programmable calculators and more particularly to a method for displaying annotators.

When a particular numerical value or character is to be inserted into a space assigned for a variable through a keyboard in the course of execution of a stored program, a display panel can display as an annotator what kind of numerical value or character should be introduced. The display on the panel is often hardly readable upon display of keyed information, depending on the contents of the annotator.

OBJECTS AND SUMMARY OF THE INVENTION

Accordingly, it is an object of the present invention to provide a highly legible display useful in executing a stored program in a programmable calculator.

It is another object of the present invention to provide a programmable calculator which is capable of erasing an annotator and displaying only a keyed input upon introduction of the keyed input pursuant to the annotator, or displaying both the keyed input and the annotator upon introduction of the input thus enabling the operator to select optionally the form of display according to the kind of inputs to be next introduced.

In accordance with a preferred embodiment of the present invention, there is provided a programmable calculator comprising display means for displaying numerical or alphabetical data, key input means for introducing desired numerical or alphabetical data into a space assigned for a variable, means for erasing the previous contents on the display means and permitting the display means to display the introduced numerical or alphabetic data upon introduction of the numerical or alphabetic data; and means for preventing erasing of the previous contents on the display means and for permitting the display means to display the introduced numerical or alphabetic data together with the previous contents upon introduction of the numerical or alphabetic data.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
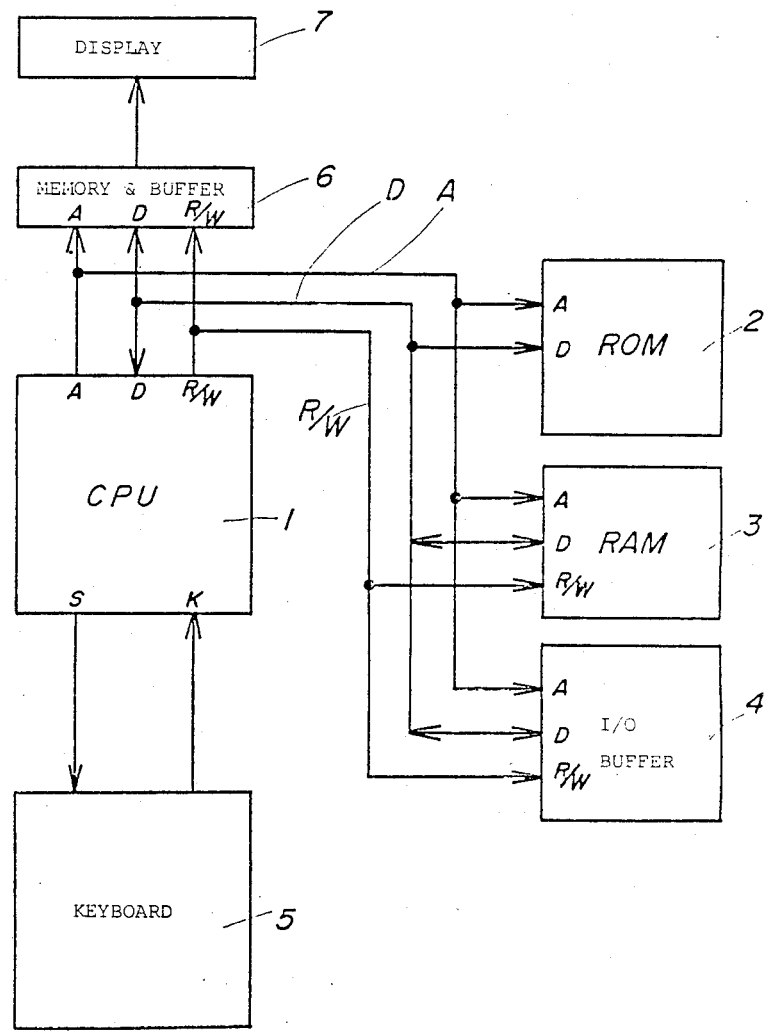
FIGS. 1 and 2 are block diagrams of a programmable calculator in accordance with an embodiment of the present invention.

Referring first to FIG. 1, there is illustrated a schematic block diagram of a programmable calculator in accordance with a preferred embodiment of the present invention, which includes a central processing unit (CPU) 1, a read only memory (ROM) 2, a random access memory (RAM) or a read/write memory 3, an input/output buffer 4, a keyboard 5, a display memory and buffer 6 and a display panel 7.

CPU 1 provides various controls according to instructions previously stored in ROM 2: for example, (1) scanning the keyboard and loading the input/output buffer 4 with introduced key codes; (2) unloading RAM 3 into the input/output buffer 4: (3) loading the display memory and buffer 6 with the contents of the input/output buffer 4 through proper conversion for displaying purposes; (4) executing operations, introducing and displaying keyed information while interpretting a stored program in RAM 3; and (5) unloading the input/output buffer 4 into RAM 3. ROM 2 stores sequences of introducing and displaying the keyed information and sequences (so-called interpretor) operable according to the stored program in RAM 3. RAM 3 is also used to temporarily store programs or data for arithmetic operations or the results of the arithmetic operations. The input/output buffer 4 is used as a temporary storage for the keyed input or information to be displayed. The keyboard 5 is arranged in a matrix supplied with strobe signals from CPU 1 and provides key signals K with a predetermined number of numerical and alphabetical keys switches, symbol keys or the like. The buffer 6 receives the information to be displayed and supplies display signals compatible with the display panel 7 to the panel 7 through decoding. An address bus is labeled A, a data bus is labeled D and a read/write signal is labeled R/W.

Figure 2:
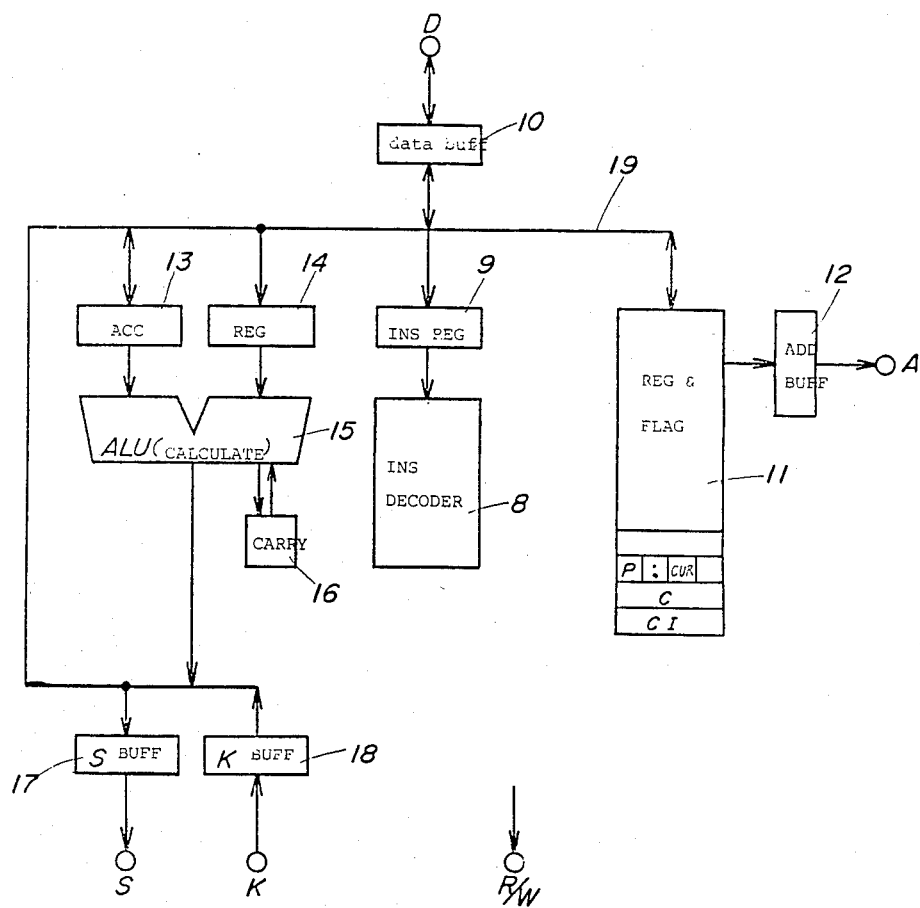

FIG. 2 is a block diagram detailing CPU 1 of FIG. 1. There is provided a data buffer 10 for temporarily storing the data when they are inputted or outputted, a register and flag 11 and an address buffer 12 for temporarily storing address information for ROM 2, RAM 3, the input/output buffer 4 and the display memory and buffer 6. There is further provided an accumulator 13, a temporary register 14, an arithmetic logic unit (ALU) 15 and a carry flag 16. An S buffer 17 is used to supply the strobe signals S to the keyboard 5, while a K buffer 18 is used to receive the key signals K from the keyboard 5. An instruction register 9 temporarily stores instruction codes fetched from ROM 2. An instruction decoder 8 translates the contents of the instruction register 9 and develops instruction signals. An internal data bus is labeled 19.

In the illustrated calculator, BASIC (Beginners All-purpose Symbolic Instruction Code) language may be employed as a program language and an INPUT statement is employed as key input instructions. An INPUT statement may take any of the following three forms:

(1) INPUT <variable>
(2) INPUT ▼ character ▼ , <variable>
(3) INPUT ▼ character ▼ ; <variable>

If the instruction (1) is carried out during execution of the stored program, then display panel 7 displays "?" and then "?" disappears and the keyed information appears on the panel 7 upon first introduction of a keyed information. "?" appears again on the panel upon depression of a clear (CL) key.

If the instruction (2) is executed, then "character" with a punctuation mark ▼ is displayed as an annotator on the display panel 7. This annotator is erased and the keyed information is displayed on the panel upon first introduction of the keyed information. The mark "?" is displayed again when the clear (CL) key is depressed.

If the instruction (3) is executed, then "character" with the punctuation mark ▼ is displayed as an annotator. Even through the keyed information is then introduced the annotator does not disappear and the keyed information is displayed after the annotator. Furthermore, even when the operator wishes to move the cursor to the left, the cursor can move to only one digit position to the right of the annotator (one digit after the annotator). The keyed information but not the annotator is erased upon depression of the clear (CL) key.

TABLE 1

|     |              | KEY | DISPLAY |
| --- | ------------ | --- | ------- |
| (1) | INPUT A      |     | ?       |
|     |              | 1   | 1_      |
|     |              | 23  | 123_    |
|     |              | CL  | ?       |
| (2) | INPUT▼A = ▼, A |   | A =     |
|     |              | 1   | 1_      |
|     |              | 23  | 123_    |
|     |              | ◄◄◄ | 123     |
|     |              | ◄   | 123     |
| (3) | INPUT▼A = ▼ ; A |  | A = __  |
|     |              | 1   | A = 1_  |
|     |              | 3   | A = 13_ |
|     |              | ◄◄  | A = 13  |
|     |              | ◄   | A = 13  |
|     |              | CL  | A = _   |

Table 1 shows an example of the relationship between key operations and display contents in the above three forms. It is evident from Table 1 that when the instruction (1) is executed "?" is displayed on the panel 7 and erased upon actuation of keys "123". At this moment "123" is displayed on the panel 7. If an ENTER key (input key) is depressed under these circumstances, then "123" is registered as a variable A. The variable A used herein means a memory location A in RAM 3 of FIG. 1 assigned for the variable. Through execution of the instruction INPUT A the keyed information "123" is loaded into the memory location A in RAM 3. However, if the CL key is depressed before actuation of the ENTER key for the purpose of cancellation, the panel 7 displays "?" and the calculator returns to its original state. In instruction (2) "A=" corresponds to "Character" and is displayed in the form of "A=" during execution of this instruction. This display serves as an annotator instructing the operator to specify the value of A through key input. After the operator introduces the value A via the keys, nothing more that the keyed information is displayed on the panel. This instruction is useful in displaying the keyed information beginning with the start of the panel (or the most significant digit position). It is noted that the keyed information can be corrected in part by depressing a cursor key. Although an annotator "A=" is displayed during execution of the instruction (3) in a like manner as the instruction (2), there is a major distinction between the two in that the keyed information "13" follows the annotator on the display and the cursor is prohibited from moving into the portion of the display showing the annotator and only the keyed information is erased upon depression of the CL key. The last form of the instructions is of use when it is desirable to display simultaneously both the keyed information and the annotator on the same panel.

Figure 3:
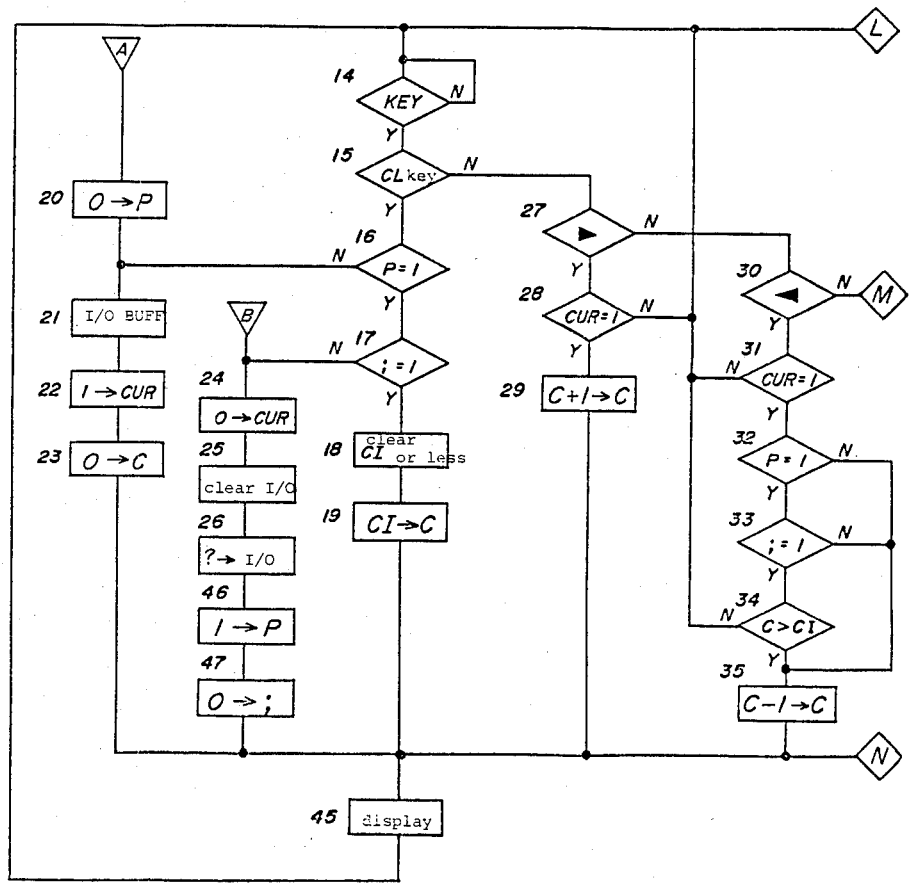
FIGS. 3(A) and 3(B) are flow charts for explanation of operation of the embodiment shown in FIGS. 1 and 2.
Figure 3:
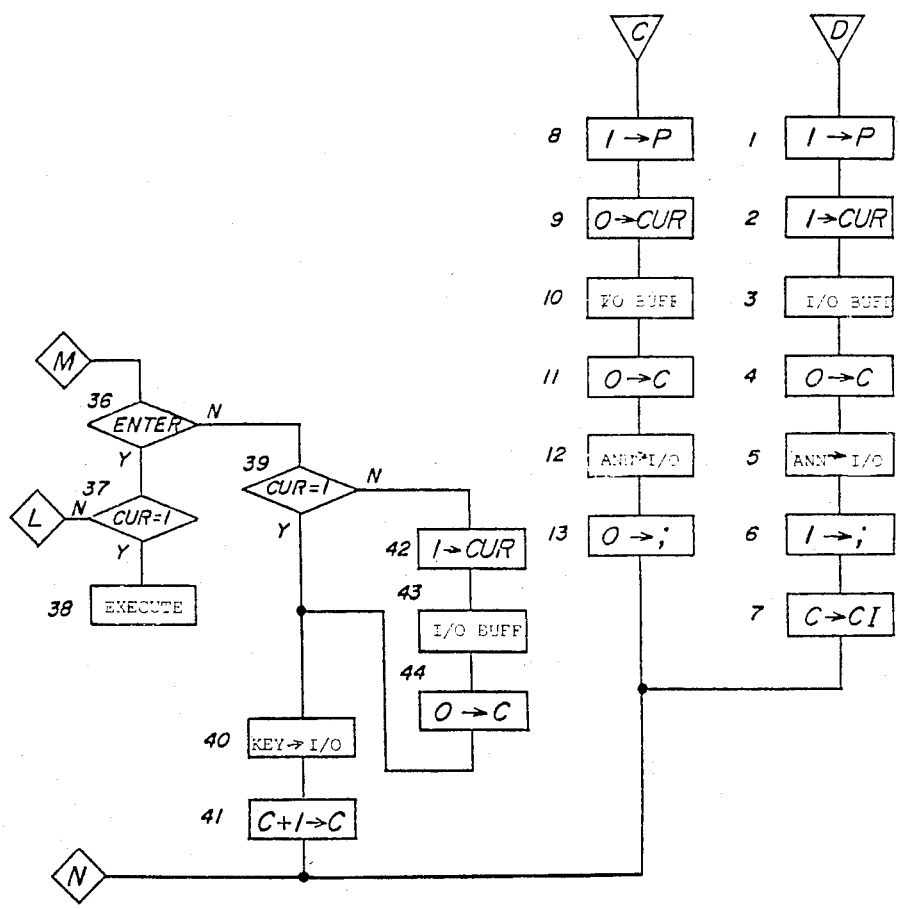

Operation of the above illustrated calculator will be more clearly understood from a review of the flow charts of FIGS. 3(A) and 3(B). The registers and flags used herein are as follows:

;: flag indicating that the annotator is not erased even upon introduction of the keyed information.

P: flag indicating a key input instruction (INPUT statement)

CUR: flag indicating that the keyed information is displayed together with the cursor.

C: register storing the address of the input/output buffer 4 where the keyed information is introduced.

CI: register storing the address next to the end of the annotator stored beginning with the most significant digit position of the input/output buffer 4.

As stated previously, the keyboard of FIG. 1 includes the alphanumeric keys, the symbol keys, the clear (CL) key, the cursor keys (◄, ►) and the input (ENTER) key. When depressing the alphanumeric keys and the symbol keys is desirable with "CUR=0" (display with the cursor), the previous display is cleared from the display panel (i.e., the input/output buffer 4 is cleared) and C is reset so that the keyed information enters the most significant digit position of the input/output buffer 4. As a result, only the keyed information is displayed on the panel 7 and the cursor is displayed on the right side of the keyed information continuously until CUR is set. Events in this routine happen in the order of 14→15→27→30→36→39→42→43→44→40→41→45.

When "CUR=1" or the cursor is also displayed, the keyed information is loaded into the address of the input/output buffer 4 as specified by C and C is incremented as "+1". It is understood that the operation "+1" is unnecessary when C identifies the last address of the input/output buffer 4 before "+1" (39→40→41→45).

When the CL Key is depressed and "P=0" (i.e., the absence of any key input instruction or INPUT statement, the input/output buffer 4 is cleared and the cursor is displayed at the head of the input/output buffer 4 (15→16→21→22→23→45). When "P=1" and ";=0", the input/output buffer 4 is cleared, CUR,; is reset and P is set, thus loading the input/output buffer 4 with "?" (15→16→17→24→25→26→46→47→45). It follows that only "?" is displayed on the first position of the display panel 7. With "P=1" and ";=1", the addresses of the input/output buffer 4 following CI, i.e., the addresses following the annotator are cleared and the cursor is displayed on the right side of the annotator (15→16→17→18→19→45).

When the ► key is depressed, nothing is done as long as no cursor is displayed (27→28→14). Provided that the cursor is present on the panel, C is increased by 1 (27→28→29→45). However, the addition "+1" is inhibited when the count of C identifies the last address of the input/output buffer 4 or no keyed information is loaded in the address C.

When the ◄ key is actuated, nothing is done as long as no cursor is displayed (30→31→14). With the cursor on the display panel, nothing is done as long as the INPUT statement is under execution, the annotator remains on the panel, and the cursor is two digit positions to the right of the annotator with no possible subtraction "−1" (30→31→32→33→34→35→45). C is subject to "−1" when the INPUT statement is under execution and the annotator is to be erased (P=1, ;=0) or when the INPUT statement is not under execution. It is noted that "−1" is not carried out when C specifies the starting address (30→31→32→(33)→35→45).

Upon depression of the ENTER key the input/output buffer 4 is unloaded into the program memory (edition of programs), the contents of the input/output buffer 4 or the results of calculations are loaded into the data memory or command instructions are executed (36→37→38).

When the INPUT statement is not executed, introduction of the keyed information starts with Ⓐ wherein P is reset, the input/output buffer 4 is cleared and the cursor is located at the first position of the display panel.

Should the INPUT statement be encountered during execution of the program, the instructions are carried out from points Ⓑ, Ⓒ and Ⓓ, depending on the kind of the instructions.

Ⓑ: "INPUT variable" without the annotator

Ⓒ: in the presence of the annotator, erasure of the annotator upon introduction of keyed information ("INPUT ▼ annotator ▼, variable")

Ⓓ: in the presence of the annotator, annotator is not erased upon introduction of the keyed information ("INPUT ▼ annotator ▼ ; variable")

The routine Ⓒ is to clear the input/output buffer 4 and display "?" on the extreme left of the display panel 7 (no cursor is displayed). The routine Ⓒ is to clear the input/output buffer 4, insert the annotator from the highest position of the input/output buffer 4 and reset; (no cursor is on the display panel). The routine Ⓓ is carried out to clear the input/output buffer 4, insert the annotator into the highest position of the input/output buffer 4, load CI with C (C is the address next to the right of the annotator stored in the input/output buffer 4), effect "1→;" and display the cursor.

The step 45 permits the display panel 7 to display the contents of the input/output buffer 4. The contents of the input/output buffer 4 is displayed beginning with its most significant digit position in the absence of the coursor on the panel. Provided that the input/output buffer 4 is displayed beginning with its most significant digit position in this manner but C does not appear on the panel, the step is conducted to move C toward the right extreme of the panel 7.

If the ENTER key is despressed during execution of the INPUT statement, then the portion of the contents of the input/output buffer 4 after CI or the whole contents of the input/output buffer 4 are loaded into the space assigned to the variable when ; is "1" and "0", respectively.

While the foregoing has set forth the key input process when the INPUT statement demands only a variable to be introduced, it is obvious to those skilled in the art that the present invention is equally applicable when it is desired to introduce two or more variables.

For example, INPUT ▼ character 1 ▼ ; (,) <variable>, ▼ character 2 ▼ ; (,) <variable>, . . .

TABLE 2

| KEY OPERATION | DISPLAY |
|---|---|
| , | A = __ |
| 26 | A = 26 __ |

TABLE 2-continued

| KEY OPERATION | DISPLAY |
|---|---|
| ENTER | WHO ? |
| M | M __ |
| ICHEL | MICHEL __ |
| ENTER | |

Table 2 shows an example of key depressions and display patterns when the instruction INPUT ▼ A= ▼ ; A, ▼ WHO? ▼, B $" is executed. The first display pattern "A=" corresponds to "character 1". Since the boundary between the variable 1 and "character 1" is defined by the flag ";", the third form (3) of the instruction is executed wherein the annotator is not erased upon introduction of the variable 1. The next annotator "WHO?" appears on the panel 7 upon depression of the ENTER key. Since in this case the boundary between the variable 2 and "character 2" is defined by ,, the second form (2) of the instruction is in operation. In other words, "WHO?" disappears upon depression of the M key. If key operations are continued in this manner, "26" and "MICHEL" are inputted to the variable A and B $.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A programmable calculator comprising:
   display means for displaying numerical or alphabetic data;
   key input means for introducing desired numerical or alphabetic data into a space assigned for a variable;
   means for providing an annotator, said display means being responsive to said providing means for displaying said annotator; and
   display control means for selectively erasing the annotator from the display means and for displaying only the introducted numerical or alphabetic data upon introduction of the numerical or alphabetic data
   or for displaying the introduced numerical or alphabetic data together with the annotator upon introduction of the numerical or alphabetic data.

2. A device as in claim 1, wherein said annotator optionally includes a flag element, and wherein said display control means includes means responsive to said flag for displaying the numerical or alphabetic data together with the annotator upon introduction of the numerical or alphabetic data.

3. A device as in claim 2, wherein said means responsive to said flag includes means responsive to the absence of said flag for erasing the annotator from said display means upon introduction of said data.

* * * * *